(12) United States Patent
Barker

(10) Patent No.: US 7,447,753 B2
(45) Date of Patent: Nov. 4, 2008

(54) COMMUNICATIONS NETWORK FOR SELF-DETERMINING ITS OWN TOPOLOGY

(75) Inventor: Andrew James Barker, Attenborough (GB)

(73) Assignee: Ericsson AB, Stockholm (SE)

( * ) Notice: Subject to any disclaimer, the term of this patent is extended or adjusted under 35 U.S.C. 154(b) by 558 days.

(21) Appl. No.: 10/469,804

(22) PCT Filed: Mar. 6, 2002

(86) PCT No.: PCT/GB02/01002

§ 371 (c)(1),
(2), (4) Date: Mar. 26, 2004

(87) PCT Pub. No.: WO02/071793

PCT Pub. Date: Sep. 12, 2002

(65) Prior Publication Data

US 2005/0038901 A1    Feb. 17, 2005

(30) Foreign Application Priority Data

Mar. 6, 2001   (GB)   ................... 0105500.3

(51) Int. Cl.
*H04L 12/28* (2006.01)
(52) U.S. Cl. ...................... 709/222; 370/254
(58) Field of Classification Search ................ 370/254, 370/907, 389, 238, 238.1, 397, 399, 395.51, 370/395.52, 409; 709/222, 227
See application file for complete search history.

(56) References Cited

U.S. PATENT DOCUMENTS

| | | | | |
|---|---|---|---|---|
| 5,335,223 A * | 8/1994 | Iino | ............................ | 370/503 |
| 5,574,860 A | 11/1996 | Perlman et al. | | |
| 5,586,267 A * | 12/1996 | Chatwani et al. | ............. | 370/254 |
| 5,729,685 A | 3/1998 | Chatwani et al. | | |
| 5,796,736 A * | 8/1998 | Suzuki | ........................ | 370/254 |
| 6,433,903 B1 * | 8/2002 | Barry et al. | .................... | 398/79 |
| 6,654,802 B1 * | 11/2003 | Oliva et al. | .................. | 709/248 |
| 2001/0033550 A1 * | 10/2001 | Banwell et al. | .............. | 370/254 |

FOREIGN PATENT DOCUMENTS

| | | |
|---|---|---|
| EP | 0 964 543 A2 | 12/1999 |
| EP | 1 026 916 A2 | 8/2000 |
| GB | 2 350 030 A | 11/2000 |
| GB | 2 362 060 A | 11/2001 |

\* cited by examiner

*Primary Examiner*—Joseph E. Avellino
*Assistant Examiner*—Michael E Keefer
(74) *Attorney, Agent, or Firm*—Kirschstein et al.

(57) ABSTRACT

A communications network determines for itself its own network topology, that is, the identity and interconnection of nodes comprising the network. The network comprises a plurality of nodes each having at least one port. The ports are interconnected in accordance with the network topology in which communication traffic is conveyed over the network via the interconnected ports. Each port is arranged to transmit first information within the communication traffic including the identity of the port (Section trace identity) from which the communication traffic originates. Second information is transmitted between nodes identifying which first information identity relates to which node and which port. A processor is operative for determining for each node from the first and second information the identity of adjacent nodes and the identity of the ports to which its ports are connected.

16 Claims, 2 Drawing Sheets

COMMUNICATIONS NETWORK FOR SELF-DETERMINING ITS OWN TOPOLOGY

FIELD OF THE INVENTION

The invention relates to communications network and in particular to a network that can determine for itself its own network topology, that is the identity and interconnection of nodes comprising the network.

DESCRIPTION OF THE RELATED ART

As is known communications network comprise a plurality of interconnected nodes. At each node there is provided a node unit having a plurality of ports. Ports of the respective node units are interconnected to one another in accordance with the network topology, e.g. a ring configuration, mesh configuration etc. Communication traffic (information/data) is conveyed between node units by means of the interconnected ports. Communication between node units can be electrical in which case the ports of the node units are generally connected by electrical conductors and information is conveyed between nodes as modulated electrical signals or optical in which case communication between ports is by means of modulated optical radiation which is conveyed by optical waveguides, typically optical fibres.

In the management and operation (routing of communication traffic etc) of communications networks it is a requirement that the network topology be known that is the identity and interconnection of node units and in particular which port of each unit is connected to which port of which other node unit. It is particularly advantageous for the network to be capable of determining for itself its own network topology.

An example of a known communications network that is capable of determining its network topology is an ATM (asynchronous transfer mode) or IP (internet protocol) network. Such networks use Multi Protocol Label Switching (MPLS) to provide a label addressing, quality of service together with an associated capability of determining their own network topology. An example of such a network is illustrated in FIG. 1. The network comprises five nodes A to E which are interconnected to one another by respective ports labelled $A_1$, $A_2$ ... to $E_1$. As is known communication traffic (customer data/information) is communicated across the network by selective routing between ports in dependence up signalling information which, it is to be noted, is carried over the same physical interconnection between ports, that is in-band signalling. In the context of the present patent application control signalling information refers to information such as routing/management/quality of service etc which is used for control/operation of the network. In contrast communication traffic, e.g. data, voice, video etc is the information to be communicated across the system.

For the network to determine its topology, each node needs initially to determine the identity of adjacent node/s to which it is connected and how its ports are physically connected to which ports of the/each adjacent node/s. In the ATM network illustrated each node determines this information by transmitting control signalling information over each port including the identities (ID) of the node and the port. This information is transmitted in accordance with the MPLS protocol Thus each port of each node will receive the identity of each node and port it is physically connected to. In this manner each node can determine a map of adjacent nodes to which it is connected. Once each node has determined a map of adjacent nodes, each node then broadcasts to all other nodes this information thereby enabling each node to determine an overall map of the network topology.

Whilst such a method of determining network topology is adequate in ATM/IP networks the inventor has appreciated that a problem exists in determining network topology in optical communications networks especially those operating using synchronous digital hierarchy (SDH) or synchronous optical networks (SONET). In such networks, unlike ATM and IP, there is no direct access to the in-band traffic and therefore limited capability to carry in-band signalling and communication of control signalling information between nodes is carried over paths which are physically separate to those carrying the communication traffic. As a result the receiving node cannot assume a direct association (physical interconnection) of ports and consequently a problems arises in each node determining a mapping of adjacent nodes.

EP 1026916 discloses an automatic telecommunications link identification system, in which a link comprises interconnected ports of adjacent nodes of the network. Each port has a unique identifier, and is configured to transmit over the link an identification message which includes its own identifier and the presumed identifier (remote identifier) of the port at the receiving end of the link. Similarly the port at the receiving end sends an identifier message which includes its own identifier together a remote identifier. If the identification message from the ports at opposite ends of a link agree, that is, if the port identifiers are reciprocals of each other, the link is identified and the interconnectivity of the ports determined. If however, the identification messages do not agree one port will update, in response to the received port identifier, its remote identifier and re-send an identification message as an acknowledgement of the updated remote port identification.

The present invention arose in an endeavour to provide a communications network that is capable of determining its own topology which in part, at least, overcomes the limitations of the known arrangements.

BRIEF SUMMARY OF THE INVENTION

According to a first aspect of the invention there is provided a communications network comprising a plurality of nodes each having at least one port, the port being interconnected in accordance with the network topology and in which communication traffic is conveyed over the network via the interconnected ports, wherein each port has associated with it a unique port identifier and each node has associated with it a unique node identifier, and each port is arranged to transmit within the communication traffic its respective port identifier identifying the port from which the communication traffic originates, the network characterised by: comprising means arranged to transmit to each node second information, including for each node of the network, the node identifier and port identifier/s for each port associated with the node; and processing means arranged for determining for each node from received port identifier/s and second information, the identity of adjacent node/s and the identity of the port/s to which its ports are connected.

Advantageously the processing means is arranged to further determine the network topology, that is the interconnection of all ports of all nodes, from the interconnection of adjacent nodes.

The present invention finds particular application for communications network, such as synchronous systems, in which the second information is transmitted between nodes over connections which are physically separate to those interconnecting the nodes and which carry the communication traffic.

Preferably in such a network the second information is transmitted as part of the control signalling information.

Preferably the processing means is distributed among the nodes of the network. In a preferred arrangement each node includes processing means capable at least of determining the identity of adjacent node/s and the identity of the respective ports that each of its ports is interconnected.

Preferably, the nodes include storage means for storing pre-loaded check information, the check information including the port identifiers that can be expected to be received on respective ports of the node, and means for comparing the port identifiers received at its ports with the check information for validating the integrity of the connection of the nodes ports.

Preferably the port identifier is carried within an overhead part of the communication traffic. Advantageously the second information is transmitted in the form of a modified Internet Protocol.

Preferably, the network is an optical communications network in which communications traffic is transmitted between nodes in the form of optical radiation modulated with the communication traffic said radiation being is conveyed by radiation guiding means, preferably optical fibres.

In one arrangement, the network comprises a Synchronous Digital Hierarchy (SDH) network. Alternatively the network comprises a Synchronous Optical Network (SONET). In such communication networks the port identifier comprises a section trace identifier which is advantageously carried within section overhead of the synchronous traffic frame. Advantageously the second information is transmitted within a data communications channel (DCC).

Advantageously the communications network comprises a wavelength division multiplex (WDM) network, preferably a dense WDM network. For such a network the second information is advantageously transmitted in an Optical Supervisory Channel (OSC).

According to a second aspect of the invention there is provided a method of operating a communications network of a type comprising a plurality of nodes each having at least one port, the ports being interconnected in accordance with the network topology and in which communication traffic is conveyed over the network via the interconnected nodes, wherein each port has associated with it a unique port identifier and each node has associated with it a unique port identifier; and each port transmits its respective port identifier within the communication traffic identifying the port from which the communication traffic originates, the method being for determining the network topology and characterised by: transmitting to each node second information which includes for each node of the network, the node identifier and port identifier/s for each port associated with the node; and determining for each node from the received port identifier/s and second information, the identity of adjacent node/s and the identity of the ports interconnecting the adjacent nodes.

BRIEF DESCRIPTION OF THE DRAWINGS

A communications network in accordance with the invention will now be described by way of example only with reference to the accompanying drawings in which.

DETAILED DESCRIPTION OF THE PREFERRRED EMBODIMENTS

Figure 1:
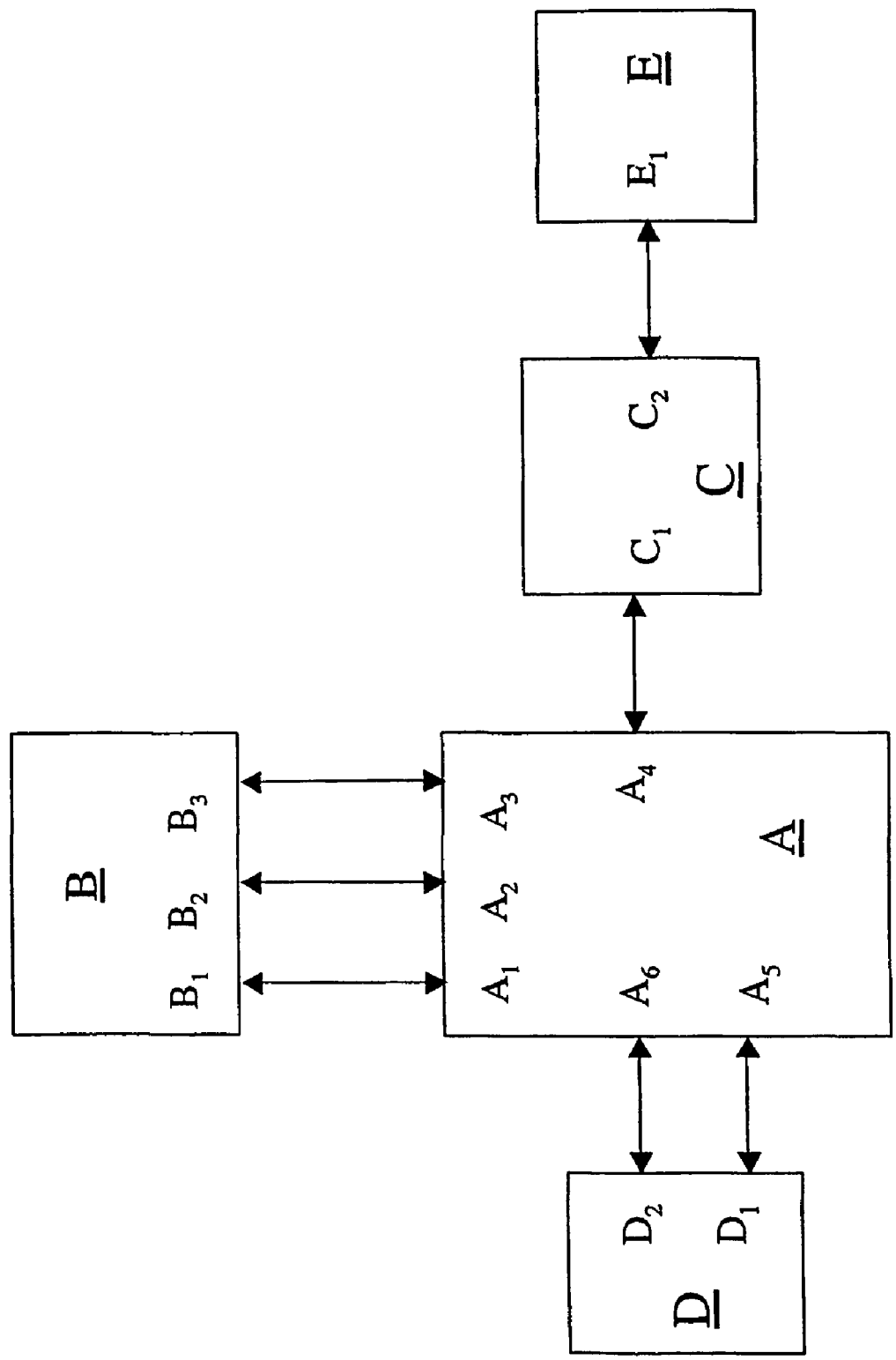
FIG. 1 is a schematic representation of a known ATM communications network as described above.
Figure 2:
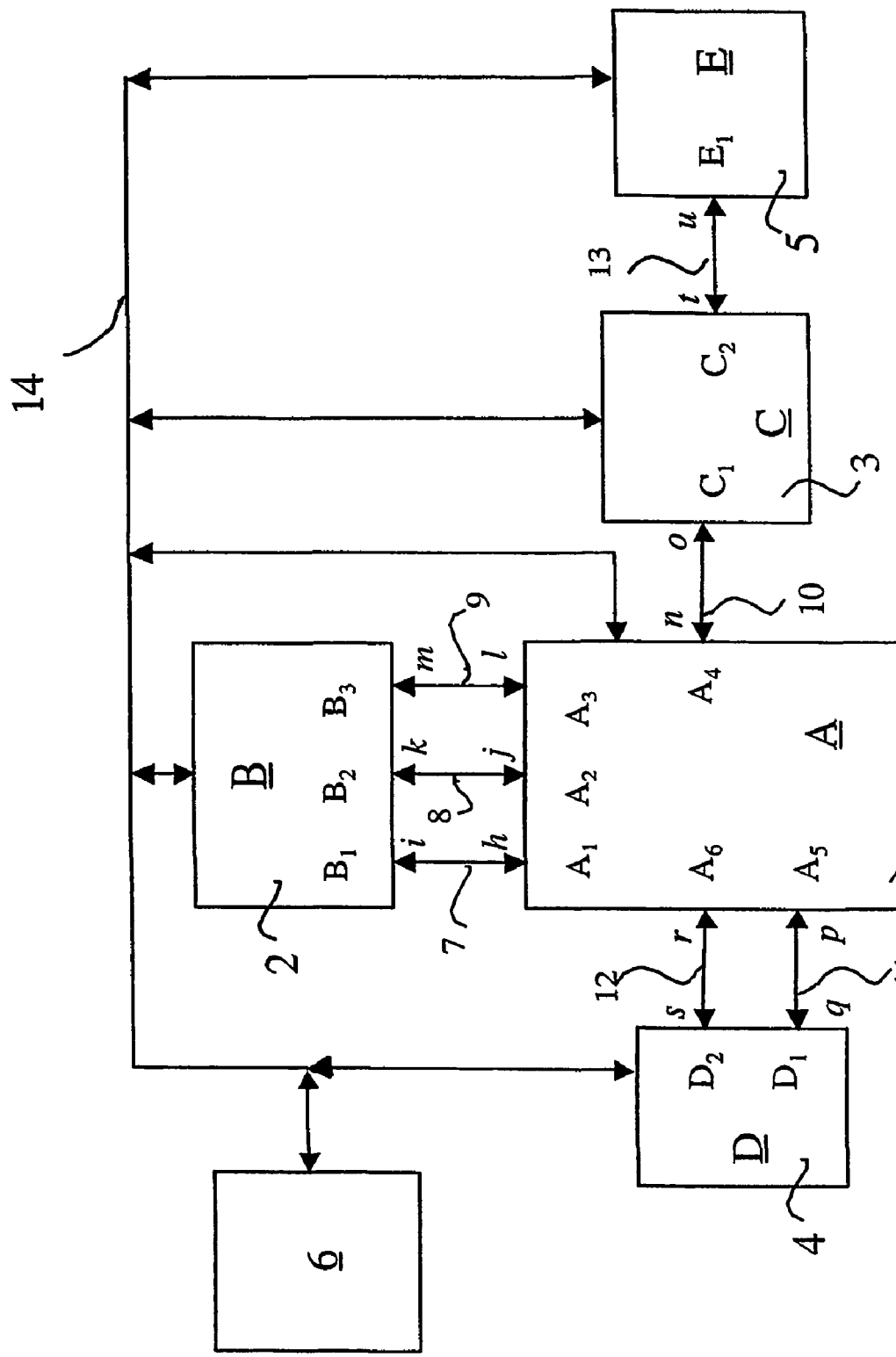
FIG. 2 schematic representation of an optical communications network in accordance with the invention.

Referring to the accompanying drawing, there is shown an optical communications network comprising five node 1, 2, 3, 4 and 5 respectively identified as A to E in the FIG. 2. Node 1 has six optical ports identified as $A_1$ to $A_6$ respectively. Node 2 has three optical ports identified $B_1$ to $B_3$ respectively; node 3 has two optical ports $C_1$ and $C_2$, node 4 has two optical ports $D_1$ and $D_2$ and node 5 a single optical port labelled $E_1$. The optical ports of the nodes are connected to each other by optical fibres 7 to 13 in accordance with the network topology and enable the transmission of communication traffic between the nodes. In the example embodiment being described the communications traffic is conveyed between the nodes in the form of modulated optical radiation in accordance with a synchronous digital hierarchy (SDH) or synchronous optical network (SONET).

The interconnection of the optical ports of the nodes 1 to 5 will now be described. The optical ports $A_1$ to $A_3$ of the node are connected to the optical ports $B_1$ to $B_3$ of the node 2 by optical fibres 7 to 9 respectively. The optical port $A_4$ of node 1 is connected to the optical port $C_1$ of node 3 by the optical fibre 10. The optical ports $A_5$ and $A_6$ of node 1 are respectively connected to the optical ports $D_1$ and $D_2$ of node 4 by the optical fibres 11 and 12 respectively. Finally the optical port $C_2$ of node 3 is connected to the optical port $E_1$ of node 5 by the optical fibre 13.

The network being described is a simplified network topology for the purposes of elucidating the invention. In practical communications networks the topology would likely comprise many tens or even hundreds of nodes connected in ring, mesh or other network topologies.

The network further comprises a management source 6 for controlling operation of the network. The source 6 is connected to each node 1 to 5 by an independently routed signal control communications link 14. The communications link 14 accesses the node 1 to 5 via ports which are unlabelled in FIG. 2 and are independent of the ports of the node used for conveying communication traffic. The management source 6 represents an information source, which may belong to the network management system. The communications link 14 allows bi-directional communication from the source 6 to each node and also bi-directional communication between the nodes.

As is known in SDH networks each node transmits within the communications traffic a first piece of information which is unique to the port from which the communications traffic originates. This first information termed a section trace identifier, is typically sixteen bytes long, is carried within the section overhead of the synchronous traffic frame. More specifically the section trace identifier is carried within sixteen consecutive J0 bytes of the SDH frames. On initial configuration of the network the unique section trace identifier associated with each physical port is allocated by the management source 6 and communicated to the respective node via the communications link 14. A section refers to the physical link between two ports. Thus each section is uniquely defines by two section trace identifiers.

For example port $A_1$ of node 1 includes a section trace identifier indicated as h in FIG. 2. Conversely port $B_1$ of node 2 which is connected to node $A_1$ and thus represents the same physical connection (section) is arranged to transmit trace information indicated as i. Similarly ports $A_2$, $B_2$, $A_3$, $B_3$, $A_4$, $C_1$, $A_5$, $D_1$, $A_6$, $D_2$, $C_2$, $E_1$ are arranged to respectively transmit section trace identifiers indicated as j to u.

As well as communicating the respective section trace identifiers to each node the source 6 also on initial configuration communicates to each port the section trace identifiers that can be expected to be received on respective ports. Each node is configured to examine the section trace identifier received at its ports and compare theses information with the expected value and thereby validate the integrity of section (physical connection). In the event that received and expected section trace identifiers do not correspond the node generates an error flag which it communicates to the management source 6. The use of section trace identifiers are well known and documented and the network described thus far is of a known configuration.

It will be appreciated that the section trace identifiers alone only provides a means of checking the correct interconnection of nodes. They do not, however, enable each node to determine for itself the identities of adjacent node to which it is connected nor to which port of the node it is attached.

In accordance with the communications network of the present invention each node is arranged to communicate with every other node second information via the communications link 14. This information is communicated between nodes using a modified internet protocol (IP). This second information comprises the identity of the node, the identity of its physical ports and the section trace identity for each port. As an example the information that node 1 communicates is given in table 1 below.

TABLE 1

| Node | Port | Section Trace identifier |
|---|---|---|
| A | $A_1$ | h |
|   | $A_2$ | j |
|   | $A_3$ | l |
|   | $A_4$ | n |
|   | $A_5$ | p |
|   | $A_6$ | r |

In this way each node ends up with information for the node identity, port identity and corresponding section trace identity for each and every node. This information is set out in table 2.

TABLE 2

| Node | Port | Section Trace identifier |
|---|---|---|
| A | $A_1$ | h |
|   | $A_2$ | j |
|   | $A_3$ | l |
|   | $A_4$ | n |
|   | $A_5$ | p |
|   | $A_6$ | r |
| B | $B_1$ | i |
|   | $B_2$ | k |
|   | $B_3$ | m |
| C | $C_1$ | o |
|   | $C_2$ | t |
| D | $D_1$ | q |
|   | $D_2$ | s |
| E | $E_1$ | u |

In operation each node combines the section trace identity extracted from the communications traffic received at its respective ports with the further information (table 2) to determine the node identity and port identity to which each of its ports is connected.

For example node 1 identifies that communication traffic received at its first port $A_1$ has a section trace identity i. From the information in table 2 processing means in the node deduces that this identity corresponds to the port $B_1$ of node 2 and thereby determines that its port $A_1$ is physically connected to port $B_1$ of node 2. In a like manner each node determines a mapping of adjacent nodes to which its ports are directly connected.

Once each node has determined the mapping of adjacent nodes it transmits this information to all other nodes via the communications link 14, enabling each node to build up a map of the layout of the network as a whole. In this way each node is able to determine for itself the identity and interconnection of all nodes comprising the network i.e. each is able to determine the network topology.

Although in the above description the determination of network topology is described as being determined at initialisation of the network it is envisaged that this process is continued during operation of the network as the SDH network topology can vary dynamically during operation. A particular benefit of the network of the present invention is that the network can determine its own topology even though communication of control signalling information between nodes takes place over physically separate communications paths to those of the communication traffic. A particular advantage of the network described is the utilisation of the section trace identity that is inherently present in SDH/SONET networks to carry the first information. The network of the present invention is thus readily realisable by the provision of processing means within the nodes and modification of the existing internet protocol used to communicate between nodes.

It will be appreciated that modifications can be made to the network describe which fall within the scope of the invention. For example in an alternative configuration it is envisaged to communicate the second information between nodes using the Data Communications Channel (DCC). Although this is an in-band communication channel it operates independently of communications traffic channels.

Furthermore the communications network can comprise a wavelength division multiplex (WDM) network or dense WDM network in which communications traffic is conveyed in the form of modulated radiation of a specified wavelength often termed a wavelength channel. In such networks one of the wavelength channels is reserved for purposes other than carrying communications traffic and is termed an Optical Supervisory Channel (OSC). Preferably in such a network the section trace identities (first information) of the node ports are carried by the OSC.

Although the above network is an optical network, it will be understood by those skilled in the art that the invention is applicable to non-optical networks in which it cannot be guaranteed that communication of signal control information will take place over the same physical paths as the communication of communications traffic. It is the division of the information into two parts as described above that enables the network of the present invention to determine its own network topology.

The invention claimed is:

1. A communications network, comprising: a plurality of nodes each having at least one port, the ports being interconnected in accordance with a network topology in which communication traffic comprising synchronous traffic frames is conveyed over the network via the interconnected ports, each port having a unique port identifier, each node having a unique node identifier, each port being operative for transmitting within a section overhead of the communication traffic the port's respective port identifier identifying the port from which the communication traffic originates, the information transmitted in the section overhead being insufficient to determine the identity of the node from which the communication traffic originates, means for transmitting to each node information, including for each node of the network, the node identifier and the port identifier for each port associated with the node, and processing means for determining for each node from the received port identifier and the information, an identity of an adjacent node and an identity of the port to which its ports are connected, at least one of the nodes comprising a memory for storing the determined identities.

2. The communications network according to claim 1, in which the processing means is operative for determining the topology of the network from the interconnection of the adjacent nodes.

3. The communications network according to claim 1, in which the information is transmitted to the nodes over connections which are physically separate to those interconnecting the nodes and carrying the communication traffic.

4. The communications network according to claim 3, in which the information is transmitted as part of control signaling information.

5. The communications network according to claim 1, in which the processing means is distributed among the nodes of the network.

6. The communications network according to claim 1, in which the nodes include storage means for storing pre-loaded check information, the check information including the port identifiers that can be expected to be received on respective ports of the node, and means for comparing the port identifiers received at the ports with the check information for validating an integrity of the connection of the ports of the nodes.

7. The communications network according to claim 1, in which the port identifier is transmitted as a part of an overhead part of the communication traffic.

8. The communications network according to claim 1, in which the information includes a modified internet protocol.

9. The communications network according to claim 1, in which the network is an optical communications network in which the communication traffic is transmitted between the nodes as optical radiation modulated with the communication traffic, and in which the radiation is conveyed by radiation guiding means interconnecting the nodes.

10. The communications network according to claim 1, in which the network comprises a synchronous digital hierarchy (SDH) network.

11. The communications network according to claim 10, in which the port identifier comprises a section trace identifier which is carried within section overhead.

12. The communications network according to claim 10, in which the information is transmitted within a data communications channel (DCC).

13. The communications network according to claim 1, in which the network comprises a synchronous optical network (SONET).

14. The communications network according to claim 1, in which the network comprises a wavelength division multiplex (WDM) network.

15. The communications network according to claim 14, in which the information is transmitted within an optical supervisory channel (OSC).

16. A method of operating a communications network comprising a plurality of nodes each having at least one port, the ports being interconnected in accordance with a network topology in which communication traffic comprising synchronous traffic frames is conveyed over the network via the interconnected nodes, each port having a unique port identifier, each node having a unique node identifier, each port transmitting the port's respective port identifier within a section overhead of the communication traffic identifying the port from which the communication traffic originates, the information transmitted in the section overhead being insufficient to determine the identity of the node from which the communication traffic originates, the method being performed for determining the network topology and comprising the steps of:

a) transmitting to each node information which includes for each node of the network the node identifier and the port identifier for each port associated with the node;

b) determining for each node from the received port identifier and the information, an identity of an adjacent node and an identity of the port interconnecting the adjacent nodes; and c) in at least one of the nodes, storing the determined identities in a memory of the node.

* * * * *

UNITED STATES PATENT AND TRADEMARK OFFICE
CERTIFICATE OF CORRECTION

PATENT NO. : 7,447,753 B2
APPLICATION NO. : 10/469804
DATED : November 4, 2008
INVENTOR(S) : Barker It is certified that error appears in the above-identified patent and that said Letters Patent is hereby corrected as shown below:

In Column 1, Line 62, delete "protocol" and insert -- protocol. --, therefor.

In Column 2, Line 26, delete "message" and insert -- messages --, therefor.

In Column 2, Line 43, delete "the port" and insert -- the ports --, therefor.

In Column 2, Line 55, delete "from" and insert -- from the --, therefor.

In Column 3, Line 36, after "For Such a" delete "network" and insert -- network, --, therefor.

In Column 3, Line 46, delete "port" and insert -- node --, therefor.

In Column 3, Line 46, delete "identifier;" and insert -- identifier, --, therefor.

In Column 3, Line 66, after "FIG. 2" insert -- is a --.

In Column 4, Line 5, delete "node" and insert -- nodes --, therefor.

In Column 4, Line 10, delete "node 5 a" and insert -- node 5 has a --, therefor.

In Column 4, Line 27, delete " $C_?$ " and insert -- $C_2$ --, therefor.

In Column 7, Line 9, in Claim 2, delete "l,in" and insert -- 1, in --, therefor.

In Column 7, Line 30, in Claim 7, delete "1,in" and insert -- 1, in --, therefor.

UNITED STATES PATENT AND TRADEMARK OFFICE
CERTIFICATE OF CORRECTION

PATENT NO.        : 7,447,753 B2
APPLICATION NO. : 10/469804
DATED             : November 4, 2008
INVENTOR(S)       : Barker It is certified that error appears in the above-identified patent and that said Letters Patent is hereby corrected as shown below:

In Column 8, Line 33, in Claim 16, delete "network" and insert -- network, --, therefor.

Signed and Sealed this

Twenty-fourth Day of March, 2009

JOHN DOLL
*Acting Director of the United States Patent and Trademark Office*